United States Patent [19]
de Koning et al.

[11] Patent Number: 5,617,949
[45] Date of Patent: Apr. 8, 1997

[54] CASSETTE, DESIGNED TO RECIEVE FLAT OBJECTS, ESPECIALLY DATA CARRIERS

[75] Inventors: Willem de Koning, Papendrecht; Johannes F. Ros, Huizen, both of Netherlands

[73] Assignees: Kunststoffenfabriek l'Insigne B.V., Oud Alblas; Office Data Europe (ODE) B.V., Almere-haven, both of Netherlands

[21] Appl. No.: 624,788

[22] Filed: Mar. 27, 1996

[30] Foreign Application Priority Data

Apr. 6, 1995 [NL] Netherlands .......................... 1000080

[51] Int. Cl.⁶ .................................................. B65D 85/30
[52] U.S. Cl. ...................................... 206/307.1; 206/308.3
[58] Field of Search ................................ 206/307, 307.1, 206/308.1, 308.3, 309, 312

[56] References Cited

U.S. PATENT DOCUMENTS

| 4,527,692 | 7/1985 | Neuman . | |
| 5,099,995 | 3/1992 | Karakane et al. | 206/309 |
| 5,411,135 | 5/1995 | Danzyger et al. | 206/308.3 |

FOREIGN PATENT DOCUMENTS

| 0074729 | 3/1983 | European Pat. Off. . |
| 0287532 | 10/1988 | European Pat. Off. . |
| 0293272 | 11/1988 | European Pat. Off. . |
| 2929172 | 2/1981 | Germany . |
| 9301084 | 8/1993 | Germany . |
| 2277732 | 11/1994 | United Kingdom . |

*Primary Examiner*—Paul T. Sewell
*Assistant Examiner*—Nhan T. Lam
*Attorney, Agent, or Firm*—Marshall, O'Toole, Gerstein, Murray & Borun

[57] ABSTRACT

Cassette, designed to receive a stack of flat objects such as diskettes and compact discs, which cassette comprises a box part and a cover part, which can be fitted one inside the other in a sliding fit. In one of the parts, moreover, an element is present having a step-shaped series of supporting points, by means of which the objects located in the cassette lie mutually aligned in a first defined mutual position—storage position—of the box part and cover part, whilst in a second defined mutual position—usage position—they assume a height which steadily increases in the stack. The box part and cover part are mutually hinged near one of the corners. The side wall of the box part which is situated next to the hinge axis is provided with an opening at a short distance from the bottom wall, and the element having the step-shaped supporting points is fitted to the side wall of the cover part between the hinge axis and the opening in the box part.

4 Claims, 4 Drawing Sheets

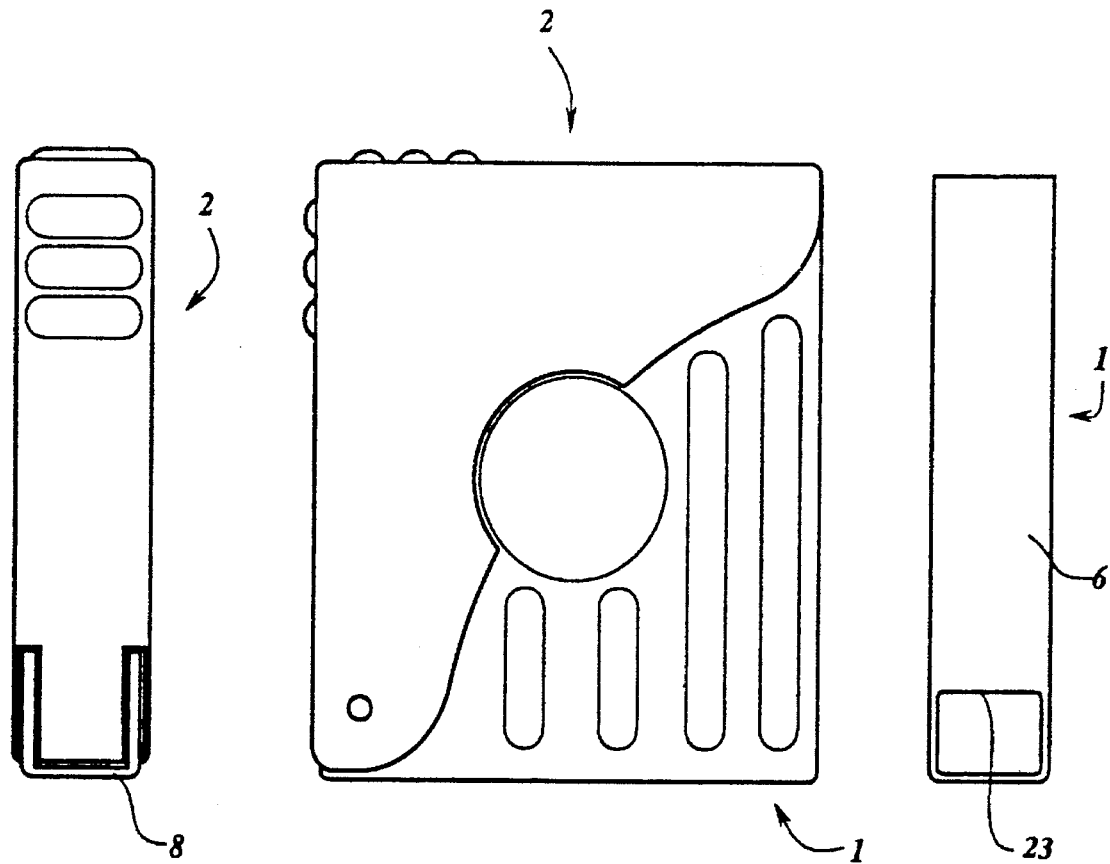
Fig. 2   Fig. 1   Fig. 3
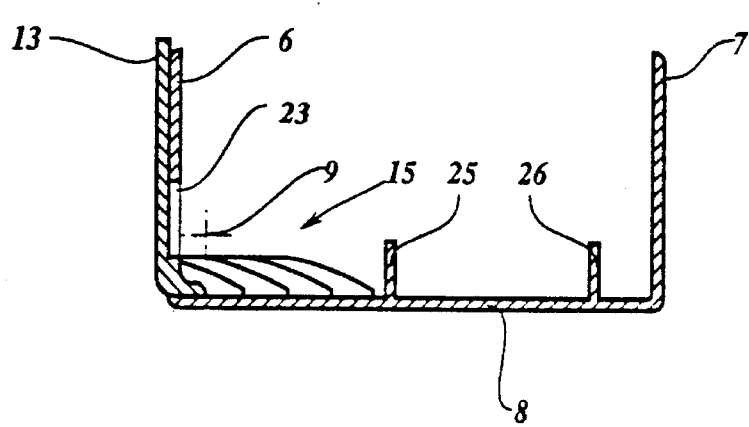
Fig. 4

CASSETTE, DESIGNED TO RECIEVE FLAT OBJECTS, ESPECIALLY DATA CARRIERS

PRIOR ART

The invention relates to a cassette for receiving flat objects, especially data carriers such as diskettes and CD's housed in the customary cases, which cassette comprises a box part and a cover part, which each comprise a front and rear wall, an end wall and at least one side wall, whilst opposite the end wall they are open, and are dimensioned such that they can at least partially be fitted one inside the other in a substantially sliding fit, in one of the cassette parts, moreover, an element being present having a step-shaped series of supporting points, by means of which the objects located in the cassette lie aligned in a defined mutual position—storage position—of the box part and cover part, whilst in another mutual position—usage position—they assume a height which steadily increases in the stack, with the result that the content is readable and they can easily be removed from the cassette.

A cassette of such a construction is known in which the cover part and the box part are separate parts, the box part containing the objects such as diskettes, whilst the cover part can be slid telescopically across it. The said element, having step-shaped supporting points, is fitted in the cover part as a transverse partition between the front and rear wall. In the storage position, a space is provided on the outer side of the box part for receiving this partition, in that the front and rear walls are lengthened relative to the side wall. The box part is provided with a transverse slot in the base. All this is realized in such a way that, when opening the cassette, one first removes the cover part, lays this down bottom side up and then drops the box part from above in the correct position in the cover part, thereby the stepped element can slip through the slot in the base of the box part. In that position it offers stepped support to the content in the form of a number of plate-shaped data carriers, so that, when the box part with these carriers is allowed to slip further downward, they end up projecting in a step shape above the apparatus. In this end position the box part is wholly immersed in the inverted cover part. The cover part is provided with slots in the front and rear wall, which slots are open on one side and enable the box part to be gripped again by the fingers and pulled upward whenever the cassette has to be re-closed and stored.

OBJECTS OF THE INVENTION

The main object of the invention is to construct the cassette in such manner that opening and closing can be carried out considerably more easily than in the case of the known cassette.

SUMMARY OF THE INVENTION

To this end, the cassette according to the invention exhibits the following characteristics:

the box part and cover part are mutually hinged one of the corners of the box part close to the end wall (bottom wall) of the box part, that side wall of the box part which is situated next to the hinge pin is provided with an opening at a short distance from the bottom wall, the element having the step-shaped supporting points is fitted to the side wall of the cover part between the hinge pin and the opening in the box part, and that side wall of the cover part which lies opposite the side wall bearing the element having the step-shaped supporting points is omitted.

The cassette can thus be opened by a simply swinging the cover part into the usage position in which the objects located therein rise upward into a stepped position. Closing is realized in the reverse sense simply by pivoting the cover part into the closed position.

The inventive concept is applicable to all kinds of flat objects. Diskettes and CD's which are housed in their currently standardized packaging are the most prominent applications.

The invention will be explained below with reference to the appended drawing of an illustrative embodiment.

DESCRIPTION OF THE DRAWINGS

FIG. 1 represents a front view of the cassette, in an embodiment which is dimensioned to receive five diskettes, in closed position of the cassette;

FIG. 2 represents an side view directed at the left side;

FIG. 3 represents a side view of the box part alone, likewise directed at the left side;

FIG. 4 represents a partial vertical cross-section through the inside of the cassette at the place indicated by IV—IV in FIG. 8;

DESCRIPTION OF THE PREFERRED EMBODIMENT

FIG. 1 depicts the cassette according to the invention in front view in the closed state, i.e. the storage position. The box part is indicated in its entirety by 1 and the cover part by 2.

Figure 5:
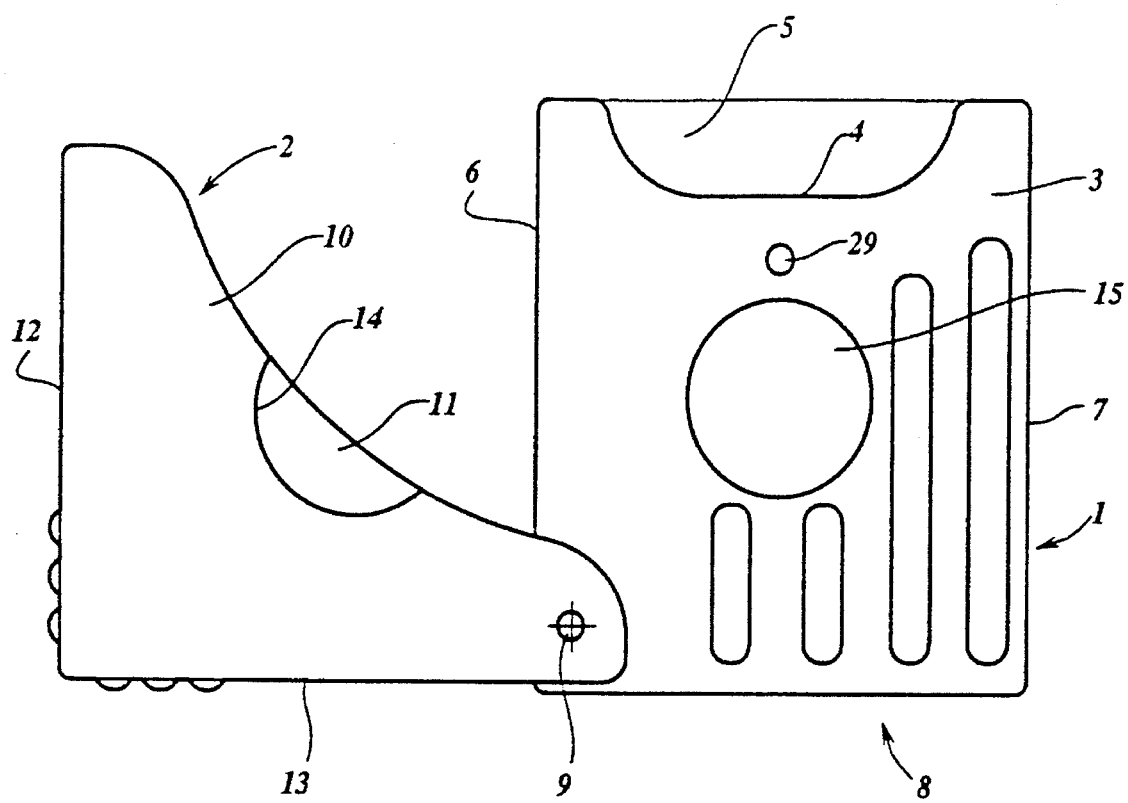
FIG. 5 offers a view in the same direction as FIG. 1, but in the open position of the cover part and with no packed objects located in the box part.

The shape of the two parts is more clearly apparent from FIG. 5, which shows a view in the same direction but in the open position, being the usage position. The box part 1 is formed by an substantially right-angled front wall 3, provided along the top edge with a grip recess 4. Through this can be seen the rear wall 5, which has substantially the same dimensions as the front wall 3 and extending parallel thereto, but not provided with a grip recess. The front and rear walls are connected by two side walls 6 and 7 and a bottom wall or end wall 8. On the top side, i.e. opposite the bottom wall 8, the box part is open.

The cover part 2, which is swung open about a hinge axis 9, is formed by a front wall 10 and rear wall 11 parallel thereto, a top wall 12 and a side wall 13. The top and side walls 12, 13 stand at right-angles to each other and the delimitation of the front and rear wall 10 and 11, respectively, has a curved course, approximately according to the diagonal of the rectangle which can be based upon the sides 12 and 13. Opposite the top wall 12 and opposite the side wall 13, the cover part is open. The front wall 10 is further provided with a semi-circular recess 14, which fits around a round elevation 15 in the middle of the front wall of the box part. The walls 12 and 13 of the cover part have a larger width than the walls 6, 7 and 8 of the box part 1, such that the cover part 2 fits externally around the box part 1. The hinge 9 can thus be formed by two small projections on the front wall 3 and rear wall 5, respectively, of the box part, cooperating with recesses in the front wall 10 and rear wall 11, respectively, of the cover part, assembly being able to be realized by slight deformation of the material.

Figure 7:
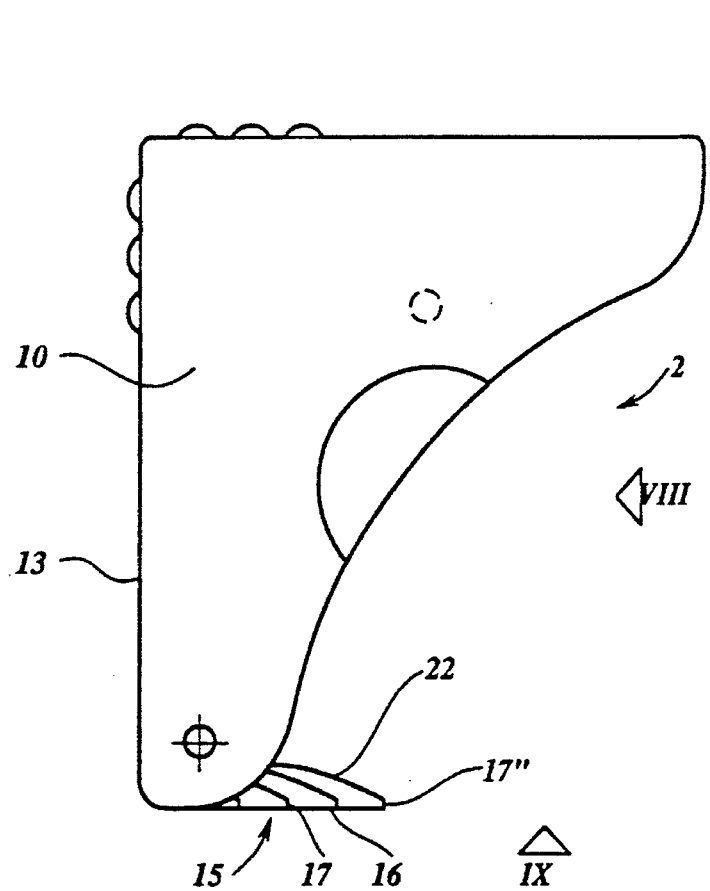
FIG. 7 represents a front view of the cover part.
Figure 8:
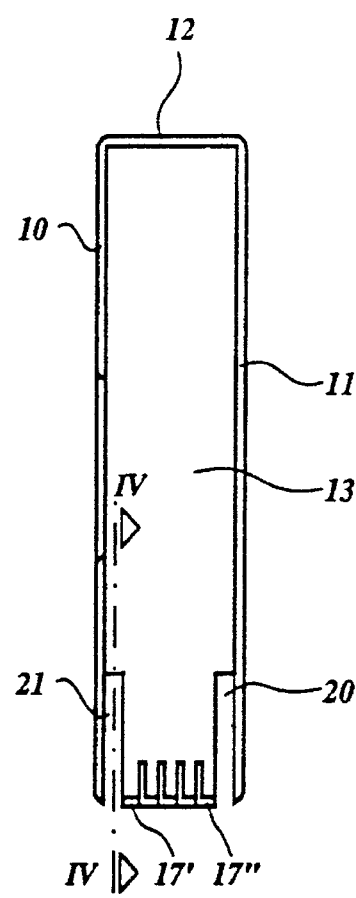
FIG. 8 represents an associated side view from the right, according to the arrow VIII in FIG. 7.
Figure 9:
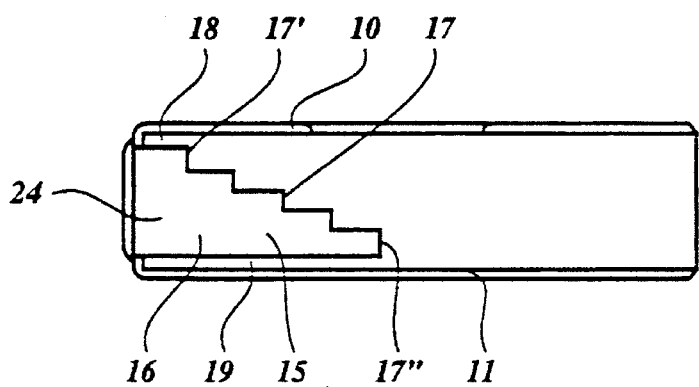
FIG. 9 represents a bottom view of this cover part, according to the arrow IX in FIG. 7.

As is particularly apparent from FIGS. 7 to 9, fitted to the inner side of the side wall 12 of the cover part 2 there is an element 15; when made from plastic, it is moulded on integrally. According to the invention, it is located in any event beneath the hinge pin 9 and, in the represented embodiment, right at the bottom end of the side wall 12. The bottom side 16 of the element 15 is flat. It has a stepped profile as indicated at 17 in the bottom view represented in FIG. 9. This is also the bottom view in the position which the cover part 2 assumes in the closed state of the cassette. Close to the front wall 11 of the cover part 2 there is the lowest step 17' and close to the rear wall 11 the highest step 17", whilst in the represented illustrative embodiment there are five steps present.

Between the stepped element 15 and the front wall 10, on the one hand, and the rear wall 11, on the other hand, there are interspaces 18, 19, in which the front wall 3 and rear wall 5, respectively, of the box part are received in the mounted state. To this end, these interspaces 18, 19 extend into slots 20 and 21, respectively, in the side wall 13, as is apparent from the side view represented in FIG. 8. In FIG. 3, an opening 23 is visible through which the stepped element 15 can penetrate.

In the front view represented in FIG. 7, the steps 17 all have a curved profile, such as indicated by 22 for step 17". These curvatures are such that at the base, i.e. at their point of attachment to the side wall 13, all steps have the same height.

Figure 6:
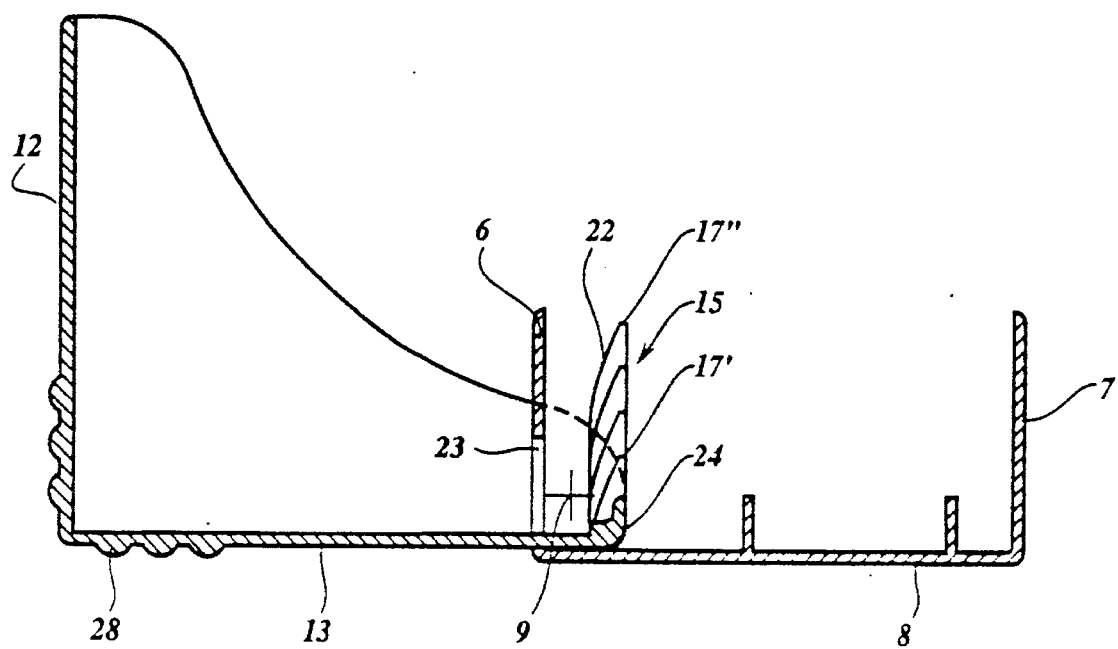
FIG. 6 represents a partial vertical cross-section at the same place as FIG. 4, but in the open position represented in FIG. 5.

The latter fact is more clearly apparent from FIGS. 4 and 6. At this point, it is worth pointing out that although, for the sake of rapid comprehension, the place where these partial cross-sections are taken is indicated by IV—IV in FIG. 8, FIG. 8 represents the cover part 2 alone, whilst FIGS. 4 and 6 illustrate the mounted state of the cover part and box part. It is also worth mentioning that FIG. 4 is drawn beneath FIG. 1 because FIG. 4 portrays the cross-section in the same state as FIG. 1, namely the usage state; similarly, FIG. 6 is drawn beneath FIG. 5 because FIG. 6 shows the cross-section in the same open state as the view represented in FIG. 5.

FIG. 8 shows the slot 21, which, with its counterpart 20, is present in the side wall 6 of the cover part in order to admit, during the assembly, parts of the front and rear wall 3, 5, respectively, of the box part.

Furthermore, it can be seen from FIG. 6 that the lowermost step 17' passes with a curvature 24 into the side wall 13; this curvature 24 extends over the entire width of the element 15 (compare FIG. 9).

Figure 10:
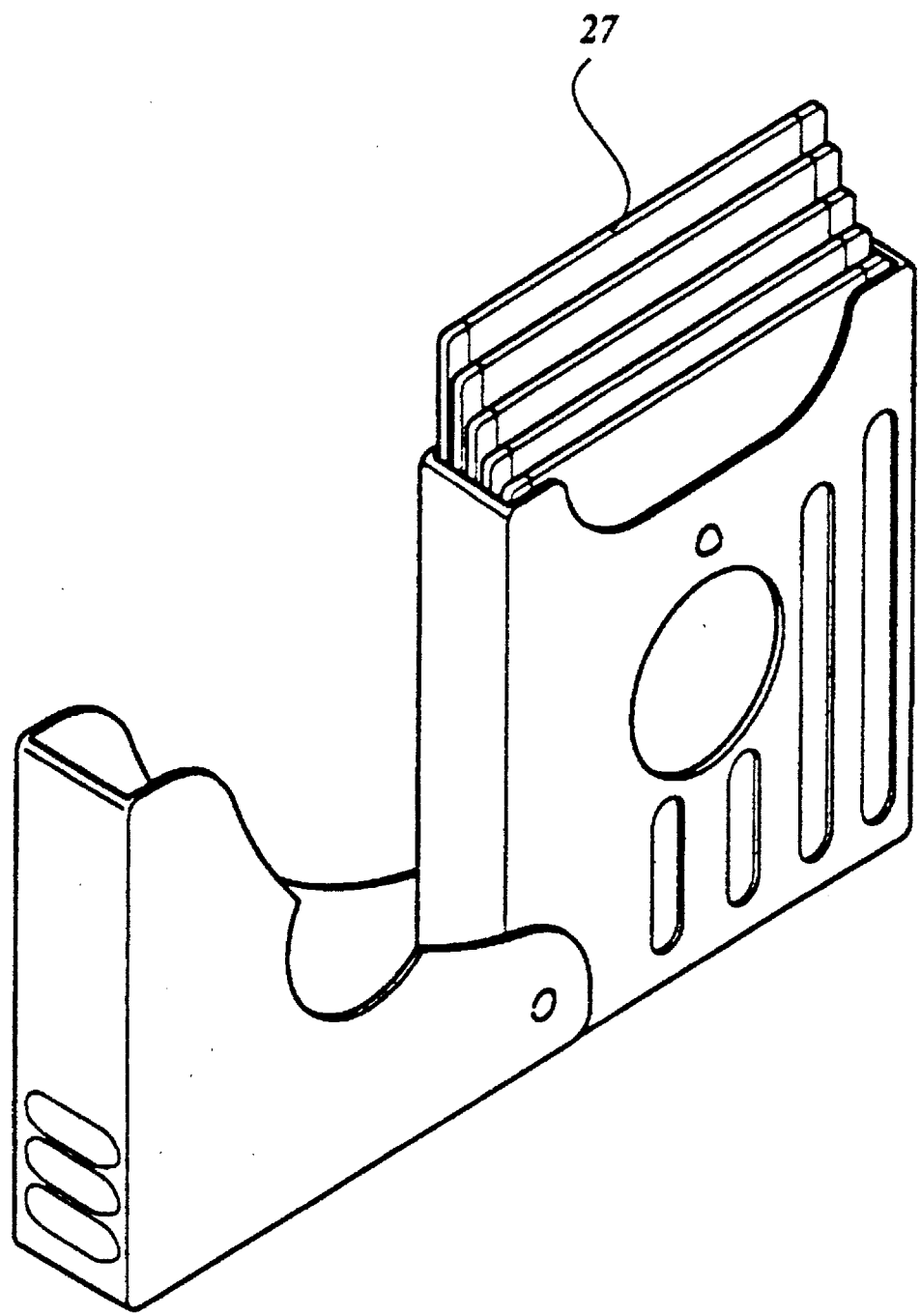
FIG. 10 shows the cassette perspectively in the open position—usage position—with a stack of diskettes which is located therein.

In the closed or storage position represented in FIG. 4, the stepped element 15 lies on the bottom wall 8 of the box part. Whenever the cover part 2 is then swung about the hinge axis 9 into the open position or usage position represented in FIG. 6, the stepped element 15 ends up standing upright. Standing on the bottom wall 8 of the box part there are also two vertical partitions 25, 26, which extend from the front wall 3 to the rear wall 5 of the box part and on which, in the storage position, the stack of objects to be stored in the box part can rest. When the cover part is pivoted open, these objects will then be lifted, after a small free stroke of the cover part, in that the curved edges, such as 22, of the different steps 17 will come to lie against the bottoms of these objects, commencing with the object lying closest to the rear wall 11, since it is this object which is reached first by the step 17". As a result of the height differences of the steps, the objects reach different heights in the fully open position and it is this state which is represented in FIG. 10.

Due to the fact that the partitions 25, 26, in the illustrated preferred embodiment, are made somewhat higher than the "height" of the stepped element 15—i.e. the vertical dimension in the closed position represented in FIG. 4—the said free stroke is created over a certain angle when the cover is opened. This facilitates the opening motion, in that there is no need to lift the weight of the packed objects directly upon opening, whilst the top wall 12 of the cover part has also to some extent already been pivoted away upward before the first diskette comes up.

It is not necessary to use two partitions 25, 26; the construction also works when the partition 26 is omitted, but the upward-pushing of the content proceeds somewhat more easily if the stack of packed objects 27 has a double support, in that fewer frictional forces resulting from tilting are then generated at the side. In the position represented in FIG. 10, the objects which rise up step by step—in this context diskettes are illustrated—can be easily removed; also indications of the content are thereby made clearly readable.

In the illustrated embodiment, five diskettes are accommodated. Using the same principles of the invention, a cassette can also be designed for a larger number, for example ten items.

It can be seen in FIG. 6 that the side wall 13 of the cover part ends up resting with the portion close to the hinge pin 9 on the bottom wall 8 of the box part. In order to be able to dimension the whole more accurately and limit the opening stroke to precisely 90°, it is advisable to provide the side wall 13 of the cover part with at least one projecting part 28, such as a rib, having a thickness which is equal to the thickness of the material of the base 8.

Finally, reference is made to a snap-locking closure of the cover part in the storage position by virtue of the bottom part being provided with a small elevation 29, which can interact in a snap-locking manner with a cavity (not represented) on the inner face of the front wall 10 of the cover part.

What is claimed is:

1. A cassette for receiving a stack of flat objects, which cassette comprises a box part and a cover part:

the box part comprising a front and rear wall, a bottom wall and two side walls;

the cover part comprising a front and a rear wall, a side wall and a top wall;

the box part and said cover part being mutually hinged near one of the corners of the box part close to the bottom wall thereof;

that side wall of the box part that is situated next to the hinge axis being provided with an opening at a short distance from the bottom wall;

the box and cover parts being dimensioned such that they can at least partially be fitted one inside the other in a substantially sliding fit; and the cover part including an element that has a step-shaped series of supporting points integral with the side wall of the cover part between the hinge axis and said opening in the box part, by means of which the objects located in the cassette lie mutually aligned when the box part and cover part are in a storage position and are automatically repositioned into heights that steadily increase when the box part and cover part are moved into a usage position.

2. A cassette as in claim 1, wherein the cassette is adapted for receiving data carriers such as diskettes and CD's housed in their customary cases, and when the box part and the cover part are in the usage position the data content of the carriers is readable and the data carriers can be easily removed from the cassette.

3. A cassette for receiving a stack of flat objects, which cassette comprises a box part and a cover part:

the box part comprising a front and rear wall, a bottom wall and two side walls;

the cover part comprising a front and a rear wall, a side wall and a top wall;

the box part and said cover part being mutually hinged near one of the corners of the box part close to the bottom wall thereof;

that side wall of the box part that is situated next to the hinge axis being provided with an opening at a short distance from the bottom wall;

the box and cover parts being dimensioned such that they can at least partially be fitted one inside the other in a substantially sliding fit;

the cover part including an element that has a step-shaped series of supporting points integral with the side wall of the cover part between the hinge axis and said opening in the box part, by means of which the objects located in the cassette lie mutually aligned when the box part and cover part are in a storage position and are repositioned into heights that steadily increase when the box part and cover part are moved with respect to each other; and said step-shaped supporting points being vertically adjoined by curved transition pieces to the side wall, each transition piece being adapted to acting during the opening motion as a sliding surface against the bottom of one of the packed objects.

4. A cassette for receiving a stack of flat objects, which cassette comprises a box part and a cover part:

the box part comprising a front and rear wall, a bottom wall and two side walls;

the cover part comprising a front and a rear wall, a side wall and a top wall;

the box part and said cover part being mutually hinged near one of the corners of the box part close to the bottom wall thereof;

that side wall of the box part that is situated next to the hinge axis being provided with an opening at a short distance from the bottom wall;

the box and cover parts being dimensioned such that they can at least partially be fitted one inside the other in a substantially sliding fit;

the cover part including a stepped element that has a step-shaped series of supporting points integral with the side wall of the cover part between the hinge axis and said opening in the box part, by means of which the objects located in the cassette lie mutually aligned when the box part and cover part are in a storage position and are repositioned into heights that steadily increase when the box part and cover part are moved with respect to each other; and said bottom of the box part comprising at least one transverse partition between the front and rear walls, the partition having a height which is at least equal to and preferably somewhat larger than the corresponding dimension of the stepped element.

* * * * *